United States Patent
Messing

(10) Patent No.: US 11,454,206 B2
(45) Date of Patent: Sep. 27, 2022

(54) ROTOR BLADE FOR A WIND TURBINE

(71) Applicant: Wobben Properties GmbH, Aurich (DE)

(72) Inventor: Ralf Messing, Aurich (DE)

(73) Assignee: Wobben Properties GmbH, Aurich (DE)

( * ) Notice: Subject to any disclaimer, the term of this patent is extended or adjusted under 35 U.S.C. 154(b) by 931 days.

(21) Appl. No.: 16/306,766

(22) PCT Filed: Jun. 7, 2017

(86) PCT No.: PCT/EP2017/063760
§ 371 (c)(1),
(2) Date: Dec. 3, 2018

(87) PCT Pub. No.: WO2017/211855
PCT Pub. Date: Dec. 14, 2017

(65) Prior Publication Data
US 2019/0128240 A1    May 2, 2019

(30) Foreign Application Priority Data
Jun. 7, 2016   (DE) ............... 10 2016 110 510.4

(51) Int. Cl.
*F03D 1/06*        (2006.01)

(52) U.S. Cl.
CPC ......... *F03D 1/0641* (2013.01); *F03D 1/0633* (2013.01); *F05B 2240/301* (2013.01); *Y02E 10/72* (2013.01)

(58) Field of Classification Search
CPC .... F03D 1/0633; F03D 1/0641; F03D 1/0675; F03D 1/0683; F05B 2240/301
See application file for complete search history.

(56) References Cited

U.S. PATENT DOCUMENTS 5,474,425 A * 12/1995 Lawlor ............... F03D 1/065
                                                    416/223 R
8,061,996 B2 * 11/2011 Herr .................. F03D 1/0633
                                                    416/223 R
(Continued)

FOREIGN PATENT DOCUMENTS

| CN | 101592121 A | 12/2009 |
| CN | 201424996 Y | 3/2010 |

(Continued)

OTHER PUBLICATIONS

Phengpom et al., "Study on Blade Surface Flow around Wind Turbine by Using LDV Measurements," *Journal of Thermal Science* 24(2): 131-139, 2015.

*Primary Examiner* — Kenneth Bomberg
*Assistant Examiner* — Julian B Getachew
(74) *Attorney, Agent, or Firm* — Seed IP Law Group LLP

(57) ABSTRACT

A rotor blade of an aerodynamic rotor of a wind turbine having a rotor axis of rotation and an outer radius, comprising a blade root for fastening to a rotor hub, a blade tip which faces away from the blade root, a blade longitudinal axis which extends from the blade root to the blade tip, a blade front edge which faces toward the front in the direction of movement of the rotor blade, a blade rear edge which faces toward the rear in the direction of movement of the rotor blade, and profile sections which change along the blade longitudinal axis, wherein each profile section has a profile chord which extends from the blade front edge to the blade rear edge, and each profile chord has an installation angle as an angle in relation to a rotor plane, wherein the installation angle from the blade root to the blade tip first decreases in a blade inner region oriented toward the blade root, increases again in a blade central region and decreases again in a blade (Continued)

tip region oriented toward the blade tip. A rotor of a wind turbine and to a corresponding wind turbine.

13 Claims, 4 Drawing Sheets

(56) References Cited

U.S. PATENT DOCUMENTS

| | | | |
|---|---|---|---|
| 8,258,648 B2 | 9/2012 | Nomoto et al. | |
| 8,419,371 B2 | 4/2013 | Herr et al. | |
| 8,814,525 B2 | 8/2014 | Petsche et al. | |
| 9,611,833 B2* | 4/2017 | Madsen | F03D 1/0641 |
| 9,759,185 B2 | 9/2017 | Bohlen | |
| 10,006,440 B2 | 6/2018 | Pineda Amo | |
| 10,060,274 B2* | 8/2018 | Corten | F01D 5/14 |
| 2010/0119374 A1* | 5/2010 | Wood | F03D 1/0633 |
| | | | 416/223 R |
| 2011/0150664 A1 | 6/2011 | Mickeler et al. | |
| 2012/0207610 A1 | 8/2012 | Yu et al. | |
| 2014/0119915 A1 | 5/2014 | Ruijter | |
| 2014/0286787 A1 | 9/2014 | Philipsen | |

FOREIGN PATENT DOCUMENTS

| | | |
|---|---|---|
| CN | 101749193 A | 6/2010 |
| CN | 102022259 A | 4/2011 |
| CN | 102102623 A | 6/2011 |
| CN | 102713261 A | 10/2012 |
| CN | 102762854 A | 10/2012 |
| CN | 204126820 U | 1/2015 |
| DE | 102008052858 | 4/2010 |
| DE | 102009060650 | 6/2011 |
| DE | 102012206109 B3 | 9/2013 |
| DE | 102014115524 A1 | 4/2016 |
| EP | 0100131 | 2/1984 |
| EP | 2757252 A1 | 7/2014 |
| EP | 2840255 A2 | 2/2015 |
| JP | H06264701 A | 9/1994 |
| KR | 1020130038965 A | 4/2013 |
| RU | 2015062 C1 | 6/1994 |
| RU | 2314230 C1 | 1/2008 |

\* cited by examiner

ROTOR BLADE FOR A WIND TURBINE

BACKGROUND

Technical Field

The present invention relates to a rotor blade of a rotor of a wind turbine. The present invention further relates to a corresponding rotor of a wind turbine. Moreover, the present invention relates to a corresponding wind turbine.

Description of the Related Art

Wind turbines are generally known and the wind turbine type to be encountered most frequently nowadays is a so-called horizontal-axis wind turbine. In the case of such a wind turbine, a rotor having rotor blades which are substantially arranged in a rotor plane rotates about a substantially horizontal axis of rotation. As a rule, wind turbines are designed for an average wind speed, with the length or the radius of the rotor blades and the average wind speed at the location of the wind turbine being associated with the power generated by the wind turbine.

Those skilled in the art designate the position on a rotor blade in the rotor blade longitudinal axis also as being the radius of the respective position with respect to an outer radius of the rotor. As a result, the relevant position on the rotor blade can be indicated as a radius having a value in the region from 0 to 1. The use of the radius for describing a position along the rotor blade is based on the fact that rotor blades are provided for their intended use for mounting on a rotor of a wind turbine. Rotor blades are thus always fixedly assigned to a rotor such that the use of the radius is taken as reference variable. The normalized radius has the value 0 (zero) in the center point of the rotor, that is to say in the rotor axis of rotation. At the blade tip, which designates the outermost point of the rotor, the normalized radius has the value 1 (one).

In order that locations having small average wind speeds can also be made economically attractive, the lengths or the radii of the rotor blades in the case of new wind turbines to be developed is ever further increased. In the case of rotor blade design for a wind turbine, the geometry of the rotor blade and, in connection with the profiles, the aerodynamic properties of the rotor blade are determined. Important geometric parameters of a rotor blade design are the blade depth, the blade thickness, the relative blade thickness resulting therefrom, and the geometric installation angle. The aerodynamic properties of a rotor blade substantially depend on the shape, that is to say the geometry, of the profile of the rotor blade. Here, a profile section indicates a perpendicular section through the rotor blade with respect to a rotor blade longitudinal axis. On account of the rotational speed which changes with the radius of the rotor blade, and thus also on account of the changing incidence angle, it is also expedient to change the shape of the profile section with increasing radius, that is to say adapt it to the changing rotational speed.

Such a profile has a profile front edge and a profile rear edge facing away from the profile front edge in the direction of movement, that is to say in the direction of rotation, of the rotor blade. The profile front edge, which can also be referred to as profile nose, is characterized by a front edge radius, which is also referred to as nose radius, wherein the profile rear edge frequently tapers at an angle. A connecting straight line from the profile front edge to the profile rear edge is called the profile chord. The distance from the profile front edge to the profile rear edge is called the profile depth.

The largest extent between an upper side of the profile, the suction side, and an underside of the profile, the pressure side, is called the profile thickness. The ratio of profile thickness to profile depth is referred to as relative profile thickness. The relative profile thickness is thus large if the profile has a high thickness and/or a small depth.

In operation, air flows around the profile. Here, the resulting direction from which the air strikes the profile front edge is referred to as incident direction. The resulting direction is composed of the circumferential speed of the profile and the wind speed striking the wind turbine and wind direction. The angle between the profile chord and the incident direction is referred to here as angle of attack of the profile.

A profile is designed in terms of a certain operating range in which the profile is intended to work. Here, the operating range is characterized, inter alia, by the incident speed to be expected. The profile is also designed in terms of a maximum angle of attack. Since the resulting incident direction and speed also changes on account of the relatively high rotational speed, the angle of attack of the profile also changes as a result. Finally, the local angle of attack determines the local lift and resistance of the rotor blade. It should be noted in particular that the local angle of attack is smaller in each operating state of the wind turbine than the local positive stall angle at which typically the lift greatly decreases and the resistance considerably increases and thus the aerodynamic quality is significantly impaired.

What is meant by positive stall is a flow state in which the flow separates on the suction side of the profile at high positive effective angles of attack. In the case of correctly designed profiles, the separation starts on the profile rear edge and migrates in the direction of the profile front edge with further increasing effective angles of attack. This flow state is to be avoided by the rotor blade design, in particular by a suitable choice of the installation angle for each operating state of the wind turbine.

The installation angle is adapted to the incident conditions by twisting the rotor blade. Here, the installation angle is understood to mean the angle between the profile chord and the rotor plane in the inoperative state.

Modern wind turbines have so-called pitch adjustment devices by means of which the angle of attack of the profile can be changed during operation by the complete rotor blade being turned about the rotor blade longitudinal axis. Expressed in simplified terms, the installation angle of the rotor blade is changed by the pitch adjustment devices.

When increasing the length or the radius of a rotor blade, the mechanical properties also have to be adapted in order, for example, to ensure a sufficient stiffness of the rotor blade that also has effects on the aerodynamic properties of the rotor blade. However, merely stiffening the rotor blade leads to a significantly increased weight of the rotor blade.

The German patent and Trademark Office searched the following prior art in the priority application to the present application: DE 10 2008 052 858 A1, DE 10 2009 060 650 A1, US 2014/0119915 A1, US 2014/0286787 A1 A1, EP 0 100 131 A1 and EP 2 840 255 A2.

BRIEF SUMMARY

Provided is a way to optimize the weight and the separation behavior of long rotor blades. Provided is a rotor blade of an aerodynamic rotor of a wind turbine having a rotor axis of rotation and an outer radius thus comprises a blade root for fastening to a rotor hub, a blade tip which faces away from the blade root, a blade longitudinal axis which extends from the blade root to the blade tip, a blade front edge which faces toward the front in the direction of movement of the rotor blade, a blade rear edge which faces toward the rear in the direction of movement of the rotor blade, and profile sections which change along the blade longitudinal axis, wherein each profile section has a profile chord which extends from the blade front edge to the blade rear edge, and each profile chord has an installation angle as an angle in relation to a rotor plane, wherein the installation angle from the blade root to the blade tip first decreases in a blade inner region which is oriented toward the blade root, increases again in a blade central region and decreases again in a blade tip region which is oriented toward the blade tip. Here, and in the further description of the invention, the installation angle relates to an unpitched operating state, that is to say to an operating state in which the rotor blades are not rotated out of the wind. Such an operating state is particularly present in a lower part-load operation.

For this purpose, the blade can have at the blade root a large installation angle which can have a value of 60°, to name only one example. This installation angle then at first increasingly decreases toward the blade tip. However, the installation angle then increases again still before reaching the blade tip, namely in a blade central region. In the case of profile sections which are then situated still further toward the blade tip, the installation angle then decreases again until it has reached its smallest value in the vicinity of the blade tip or at the blade tip.

A rotor blade is therefore twisted particularly because the path speed of each point on the rotor blade, that is to say also of each profile section, increases with increasing distance from the axis of rotation, and the local incident direction thereby continuously changes with increasing distance from the axis of rotation. The twisting means that it is possible for the angle of attack to be kept as constant as possible over the entire radius.

However, it has now been found that it can be advantageous not to keep the angle of attack constant over the entire radius of the rotor. Here, it has been found that it is also important to avoid a flow breakaway. However, a flow breakaway also depends on the profile or profile section. In particular, it has very generally been found that thick profiles can tend to a flow breakaway even at smaller angles of attack than is the case for thinner profiles. Therefore, for thick profiles, it can be expedient to provide a smaller angle of attack than for thinner profiles.

The proposal has been derived therefrom that the installation angle increases again in the blade central region in order thereby to locally reduce the angle of attack. It has been found that, coming from the rotor axis of rotation, the installation angle first decreases with increasing distance from the axis of rotation in order to take account of the increase in the path speed. However, so small an angle of attack can then be selected in the blade central region that it is achieved only by increasing the installation angle. With still further distance from the axis of rotation, a larger angle of attack is then again selected and/or the increase in the path speed is again taken more strongly into consideration such that the installation angle is selected to be lower again.

Here, the finding is also based on the fact that the structural properties of the rotor blade, in particular the mass of the rotor blade and thus the loads acting on the wind turbine, can be reduced if profiles having high relative profile thicknesses are displaced further outward in the direction of the blade tip, that is to say the rotor blade has in certain portions comparatively high relative profile thicknesses in the blade central region and/or in the blade tip region.

Particularly by displacing thick profiles outward in the direction of the blade tip, there can result the described effects that a flow breakaway can occur even at a small angle of attack. The occurrence of flow separation in the case of thick profiles in the blade central region can be avoided by the proposed progression of the installation angle. In particular rear edge separations which occurred in power-bearing and sound-sensitive regions can be avoided by the proposed solution, while at the same time a more lightweight and especially larger blade can be created.

It has furthermore been found that, for example for operating modes with reduced nominal rotational speed for a sound-reduced operation of the turbine, the maximum necessary pitch angle of the entire rotor blade can be reduced if the installation angle is increased only in a subregion. If namely the installation angle changes in a critical region in which first a flow breakaway is to be expected such that a flow breakaway is thus no longer so readily to be expected, the entire rotor blade has to be pitched less overall. Otherwise, this critical region namely determines the maximum necessary pitch angle of the entire blade. A rotor blade thus has an increase in the installation angle in the central region in order to reduce the effective angle of attack in operation. The relative profile thickness reduces again toward the blade tip such that the installation angle can also be less. In this respect, there results a progression of the installation angle in which the installation angle is large in the region of the blade root and first decreases along the blade longitudinal axis, then increases again in a region and then decreases again. A separation of the flow on the rotor blade in operation is also prevented in a central region with increased relative blade thickness by this progression of the installation angle.

A further refinement of the rotor blade proposes that profile sections have a relative profile thickness with a value of greater than 0.25 at least in certain portions in a region of greater than 60% with respect to the outer radius. Displacing high relative profile thicknesses in the direction of the blade tip region results in an improvement in the rotor blade in terms of weight and mass and structural properties. In this way, long rotor blades with particularly low weight can be realized, wherein at the same time separation of the flow on the rotor blade is prevented particularly in a central region with increased relative blade thickness. A comparatively thick profile still outside of 60% of the rotor can thus be realized by the proposed solution of the progression of the installation angle. As a result, a comparatively long rotor blade can be realized.

One embodiment of the rotor blade provides that the installation angle increases in the blade central region from 35% to 60% with respect to the outer radius. By displacing high relative profile thicknesses in the direction of relatively large radius regions, the limit angles of attack, that is to say the maximum permissible angles of attack for this profile section, decrease in these regions with high relative profile thickness. An increase in the installation angle counteracts this effect. With an increase in the installation angle of the profiles, the effective angle of attack decreases in operation. As a result, a separation of the flow is prevented in this region. Consequently, a rotor blade portion with large thickness can be created in this region of 35% to 60% in order thereby to form the rotor blade to be long with a good supporting structure and comparatively low weight. This makes it possible to achieve a structural improvement with respect to a conventional rotor blade which is designed to be otherwise already very thin in this central region.

The blade central region thus extends here approximately in a radius of from 35% to 60% with respect to the outer radius. It has been found that an increase in the installation angle in this region can compensate for effects which arise by displacing large relative profile thicknesses into relatively large radius regions of the blade. In addition, it has been found that an increase in the relative profile thickness beyond this radius region brings about advantages for the structural or mechanical properties particularly of an extended rotor blade. It has been found here that a structural improvement can be achieved in a region of from 35% to 80% by using thick profiles. For this purpose, an increase in the installation angle that does not need to go up to 80% is proposed in the stated region of from 35% to 60%. A high strength combined with a low weight is achieved there as a result. A thickening of the rotor blade in a region further outward, namely for positions above 80%, can be avoided. By displacing high relative thicknesses into this radius region of from 35% to 80%, it is thus possible to reduce the mass of the rotor blade by comparison with simply extended rotor blades having increased stiffness. However, the higher profile thickness also brings about a reduction in the maximum permissible angle of attack in this region before the flow separates. There is therefore provision to increase the installation angle in this region in order to reduce the effective angle of attack during operation in order to prevent separation of the flow.

In one refinement of the rotor blade, the installation angle has a local maximum in a region of between 35% and 80% with respect to the outer radius. The local maximum reflects the increase in the installation angle in the blade central region and allows a high relative profile thickness in relatively high radius regions. A correspondingly thick profile and thus a structurally strong region can be made possible in this region of the local maximum.

A further refinement of the rotor blade proposes that the installation angle has a local, in particular an absolute, minimum in a region of between 80% and 100% with respect to the outer radius. The relative profile thickness decreases from the blade central region in the direction of the blade tip such that the profiles become thinner again toward the blade tip. Thin profiles allow a high maximum angle of attack. As a result, the installation angle in the direction of the blade tip can decrease after passing through the maximum and have a local and/or absolute minimum in the blade tip region. Therefore, the profile chords can have a small angle in the vicinity of the blade tip in relation to the rotor plane. The local maximum and the local minimum are preferably spaced apart from one another by at least 15% in order to create a continuous or gradual transition.

According to another embodiment, it is proposed that the installation angles of the profile chords are positive over the entire rotor blade length or the radius, namely with respect to the rotor plane, which is here used as a reference plane. By virtue of the renewed increase in the installation angle in the blade central region, the regions of the rotor blade which follow in the direction of the blade tip also have a higher installation angle than is known from the prior art. The progression of the installation angle increases again in the blade central region over the radius such that it is positive over the entire rotor radius.

In one refinement of the rotor blade, the installation angle is 4° in a region of between 30% and 40% with respect to the outer radius and 5° in a region of between 45% and 60% with respect to the outer radius and approximately 1° in a region of between 85% and 95% with respect to the outer radius. This particular refinement allows a long and lightweight rotor blade. By virtue of high relative blade thicknesses in the relatively high radius region, the rotor blade is nevertheless robust. The installation angle is designed such that no flow separations occur on the profile rear edge in operation that would otherwise lead to a yield reduction and noise increase in the wind turbine.

In one embodiment of the rotor blade, the blade inner region extends approximately to a radius of 35% with respect to the outer radius. The blade inner region designates the region in which the installation angle decreases from the blade root in the direction of the blade tip. As a result, the increase in the rotational speed in this region with increasingly larger radius is compensated for. Thus, the angle of attack of the profiles remains substantially constant in this region.

The rotor blade is preferably characterized in that a ratio of the installation angle at a radius position of approximately 60% to the installation angle at a radius position of 40% is greater than 1.2, preferably greater than 1.5, in particular greater than 2. Consequently, there is a significant increase in the installation angle at approximately 60% by comparison with the radius position at 40%. It has been found that there can thus be achieved an advantageous transition from the region of a first local minimum of the installation angle to a local maximum and further subsequent decrease in the installation angle. For this purpose, the positions of 40% and 60% are characteristic positions in order to designate a first region of a blade thickening.

In yet a further embodiment of the rotor blade, the blade tip region extends in a radius of greater than 60% with respect to the outer radius. It has thus been found, as has been mentioned above, that the relative profile thickness can decrease again in the region from 60%. The blade tip region designates the radius region in which the installation angle decreases again in the direction of the blade tip. As a result of the decrease in the installation angle, the effective angle of attack increases in this region. Since, however, the relative profile thickness decreases in this region, it is ensured that the flow continues to bear on the rotor blade in this region and the maximum permissible angle of attack in the entire operating range of the wind turbine remains undershot.

Moreover, a rotor of a wind turbine having a rotor axis of rotation and an outer radius is proposed, wherein the rotor has at least one rotor blade according to an above-described embodiment.

Furthermore, a corresponding wind turbine having such a rotor is proposed.

BRIEF DESCRIPTION OF THE SEVERAL VIEWS OF THE DRAWINGS

The invention will be described by way of example below on the basis of embodiments with reference to the appended figures.

DETAILED DESCRIPTION

Figure 1A:
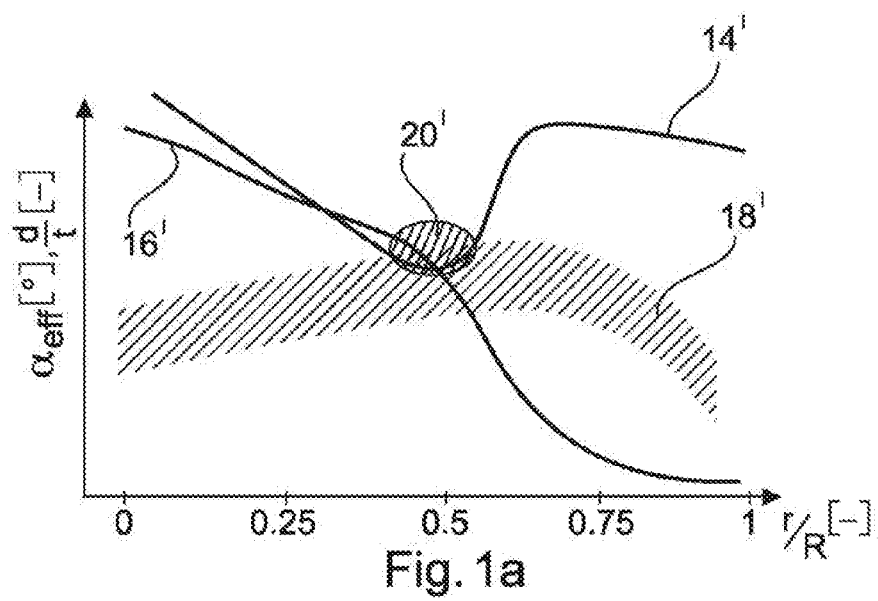
FIGS. 1a to 1c show a schematic illustration of progressions of relative profile thicknesses and limit angles of attack over the rotor radius.

FIG. 1a shows a diagram in which there are schematically plotted the progressions of the maximum permissible angle of attack 14', namely the stall angle, and of the relative profile thickness 16' in dependence on the position r thereof along the blade longitudinal axis. The position r is indicated in a normalized manner by its relative radius r/R with respect to the outer radius R of the rotor with values from 0 to 1, which thus correspond to values of 0% to 100%. FIG. 1a shows the conditions as are typically present in the case of a rotor blade according to the prior art. In the diagram of FIG. 1a, the stall angle 14' is plotted as a limit angle 14' for a contaminated or a wet rotor blade. Here, the limit angle 14' can be regarded as the maximum permissible effective angle of attack $\alpha_{eff}$ of the rotor blade in operation of the wind turbine. In addition, the diagram of FIG. 1a illustrates the progression 16' of the relative profile thickness d/t of a rotor blade of the prior art.

The profile 14' of the maximum angle of attack and the progression 16' of the relative profile thickness d/t are associated with one another. In the region of the blade root, the rotor blade has a high relative profile thickness. On account of the circumferential speed, which is low by comparison with the blade tip, a high maximum angle of attack 14' is also possible in the region of the blade root since rotation effects on the rotating rotor blade have a stabilizing effect on the boundary layer flow. The maximum permissible angle of attack 14' decreases from the blade root to a radius position of approximately r/R<0.35. With increasing rotor radius r/R, the relative profile thickness decreases, with the result that the profile of the rotor blade becomes more slender. For example, the thickness of the profile can become smaller if the depth of the profile remains constant. However, with increasing radius, the circumferential speed increases, stabilizing effects diminish, and, therefore, the maximum permissible angle of attack 14' also first decreases with increasing rotor radius.

The incident angle of the air on the rotor blade likewise changes with increasing radius since the rotational speed of the rotor blade increases with increasing radius. The diagram of FIG. 1a illustrates a region 18' of the effective angle of attack in operation. The effective angle of attack is calculated from the local incidence angle less the local installation angle according to the formula:

$$\alpha_{eff}(r) = \alpha(r) - \alpha_{Inst.}(r)$$

wherein $\alpha_{eff}(r)$ designates the effective angle of attack at the rotor position r, $\alpha(r)$ designates the local incidence angle at the rotor position r and $\alpha_{Inst.}(r)$ designates the local installation angle at the rotor position r. Here, it has been assumed for the sake of simplicity that the rotor blade considered is neither pitched nor twisted or that a pitch angle and a twist angle are also taken into account in the installation angle, in particular are contained cumulatively therewith.

The region 18' of the effective angle of attack in operation is illustrated as a region because the wind fluctuates, with the result that the angle of attack also has a scatter which cannot be regulated in operation.

In a central blade region, the maximum permissible angle of attack 14' falls into the region of the effective angle of attack 18', since the relative profile thickness 16' is also still relatively high in this region. Here, during operation of the wind turbine, the case can arise that the effective angle of attack 18' exceeds the maximum permissible angle of attack 14'. If this case occurs, the flow separates in this region starting from the rear edge of the profile, with the result that the resistance of the rotor blade increases and the power output decreases since the lift coefficient drops. This critical region is indicated in FIG. 1a by the reference sign 20'. An operation of the wind turbine in the critical region 20' should absolutely be avoided.

It is only with a further decrease in the relative profile thickness 16' with increasing rotor radius r/R that the maximum permissible angle of attack 14' increases again and leaves the region of the effective angle of attack 18'. The progression of the maximum permissible angle of attack 14' is based on the finding that thin profiles have a higher permissible angle of attack.

In order that locations with small average wind speeds of for example less than 6.5 m/s can also be made economically attractive, the rotor blade lengths are ever further increased. It has been found here that the increase in the rotor blade masses can be minimized if the rotor blade has profiles with high relative thicknesses over a relatively large radius region. It is thus proposed to displace profiles with relative thicknesses further outward in the direction of the blade tip. As a result, the structural properties of the rotor blade and thus also the aerodynamic properties of an extended rotor blade are improved.

Figure 1B:
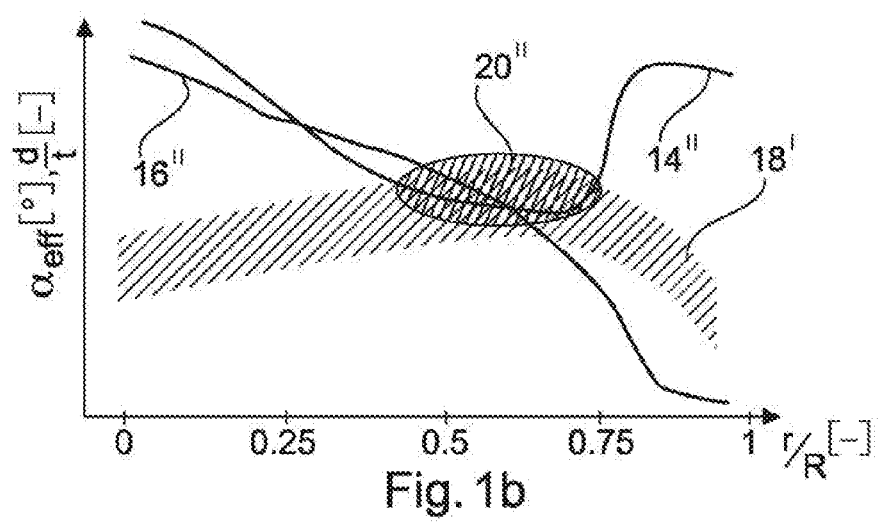

A schematic progression of the relative profile thickness according to one embodiment of the invention is illustrated in FIG. 1b by the reference sign 16''. By contrast with the progression 16' of FIG. 1a, it can be seen in the progression 16'' of the relative profile thickness in FIG. 1b that the relative profile thickness d/t remains high up to a relatively high radius region r/R.

Figure 2:
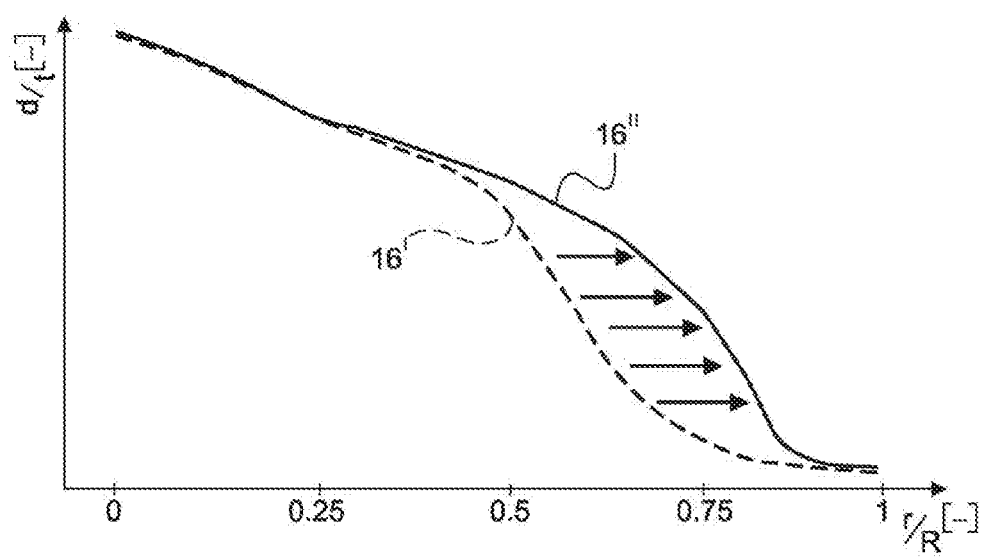
FIG. 2 shows a schematic illustration of a progression according to the invention of the relative profile thickness over the rotor radius.

A comparison of the progressions 16' and 16'' is illustrated in enlarged form in FIG. 2. FIG. 2 shows the progression 16' and the progression 16'' of the relative profile thickness d/t plotted over the standardized rotor radius r/R. Arrows indicate the displacement of the high relative profile thickness in the direction of relatively large rotor radii. According to the progression 16'' of the relative profile thickness, a rotor blade according to the invention has a high relative profile thickness d/t up to radius regions of greater than 0.5. For example, a rotor blade according to the invention now has a relative profile thickness d/t of greater than 0.25 in radius regions of greater than 0.6.

With further reference to FIG. 1b, the maximum permissible angle of attack 14'' is also displaced up to high radius regions r/R by the high relative profile thicknesses in high radius regions r/R. Accordingly, the critical region in which the effective angle of attack in operation 18' can lie above the maximum permissible angle of attack 14' is also increased. This increased critical region is indicated in FIG. 1b by the reference sign 20'' and extends into radius regions r/R between approximately 0.75 and 0.8. A pure increase in the relative profile thickness into high radius regions therefore leads to a large critical region 20'' which extends over a relatively large region of the rotor radius 12. However, an operation of the wind turbine in this critical region 20'' must be avoided under all circumstances.

Figure 1C:
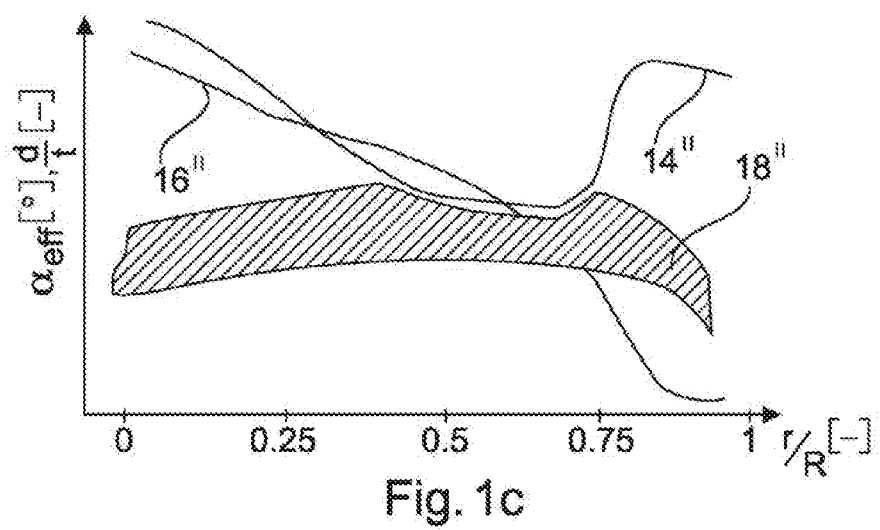

It has been found that the critical region 20'' can be omitted in operation by changing the installation angle of the profiles in the central region. For this purpose, the installation angle of the profiles is increased in the central blade region. In this way, the effective angle of attack is reduced in this region in operation. The new region of the effective angle of attack in operation is indicated in FIG. 1c by the reference sign 18". FIG. 1c also shows the progressions, which are known from FIG. 1b, of the relative profile thickness 16" and of the maximum permissible effective angle of attack 14". Increasing the installation angle in the blade central region reduces, in operation, the effective angle of attack 18" according to the above formula, with the result that, in operation, the effective angle of attack 18" does not exceed the maximum permissible effective angle of attack 14". It is ensured in this way that the wind turbine does not operate in its entire design region in a critical region in which the flow separates from the rotor blades.

Figure 3:
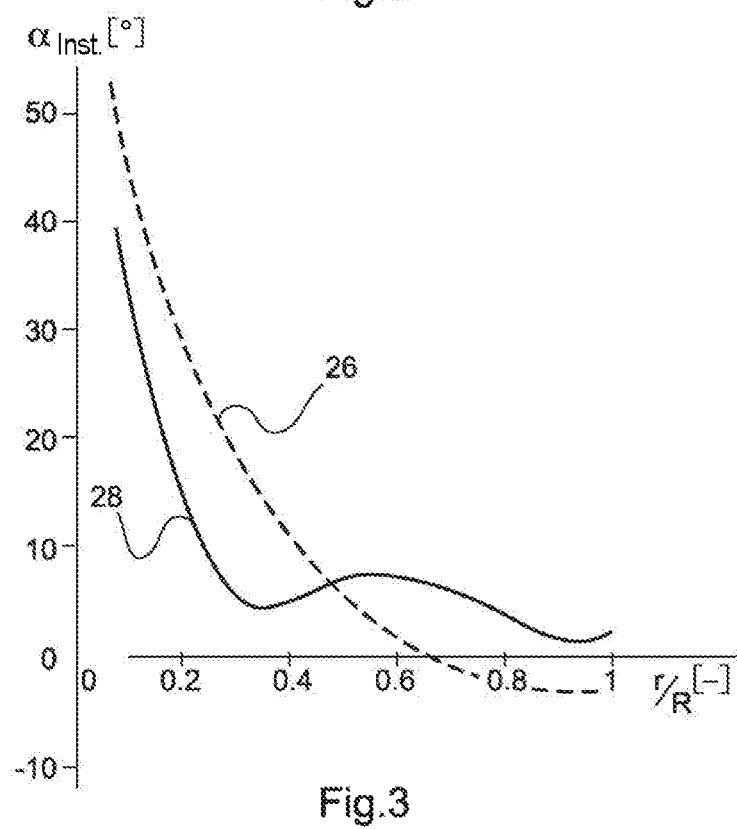
FIG. 3 shows a schematic illustration of a progression according to the invention of the installation angle over the rotor radius.

FIG. 3 now shows the progression 28 of the installation angle of a rotor blade according to one embodiment. In the diagram in FIG. 3, the standardized rotor radius r/R is plotted on the abscissa and the installation angle $\alpha_{Inst.}$ is plotted on the ordinate. For comparison purposes, a progression 26 of the installation angle of a rotor blade of the prior art is illustrated in FIG. 3. It can be clearly seen in the progression 28 of the installation angle that the installation angle first decreases in a blade inner region. This region can be for example up to 35% with respect to the outer radius of the rotor, which corresponds to a normalized rotor radius of 0.35. The blade inner region is adjoined by the blade central region which is substantially characterized in that the installation angle 28 increases again in this region. The blade central region can extend for example over a region of approximately 35 to 60% with respect to the outer radius. This corresponds to a region of 0.35 to 0.6 of the normalized rotor radius. The blade central region is adjoined by the blade tip region which is characterized in that the installation angle of the profiles decreases again in this region. This region can extend for example in a radius of greater than 60% with respect to the outer radius (0.6 normalized rotor radius).

It can also be seen in FIG. 3 that the progression 28 of the installation angle of a rotor blade according to the invention has a local maximum in the blade central region. The installation angle 28 in the region about the local maximum can be only 0.125 times the installation angle at a radius position of 10% with respect to the outer radius. After passing through the local maximum, the installation angle 28 decreases, in a region of greater than 60% with respect to the outer radius, less quickly than in the blade inner region in a region of from 0% to 35% with respect to the outer radius. The progression 28 of the installation angle has a local minimum in the blade tip region. In particular, there is provision that the progression 28 of the installation angle has a global or absolute minimum in the blade tip region.

In one particular embodiment of the rotor blade according to the invention, there is provision that the installation angle increases again in the outermost blade tip region in the vicinity of the blade tip, which can also be seen in FIG. 3.

The abscissa indicates the zero line of the installation angle in the diagram of FIG. 3. The zero line substantially corresponds to the rotor plane of the rotor of the wind turbine, wherein the installation angle relates to an unpitched operation, particularly in a lower part-load operation. FIG. 3 clearly shows that the installation angle 28 is positive over the entire radius. By contrast, the progression 26 of the installation angle shows that rotor blades exist in the prior art in which the installation angle can be negative in the blade central region or blade tip region.

Figure 4:
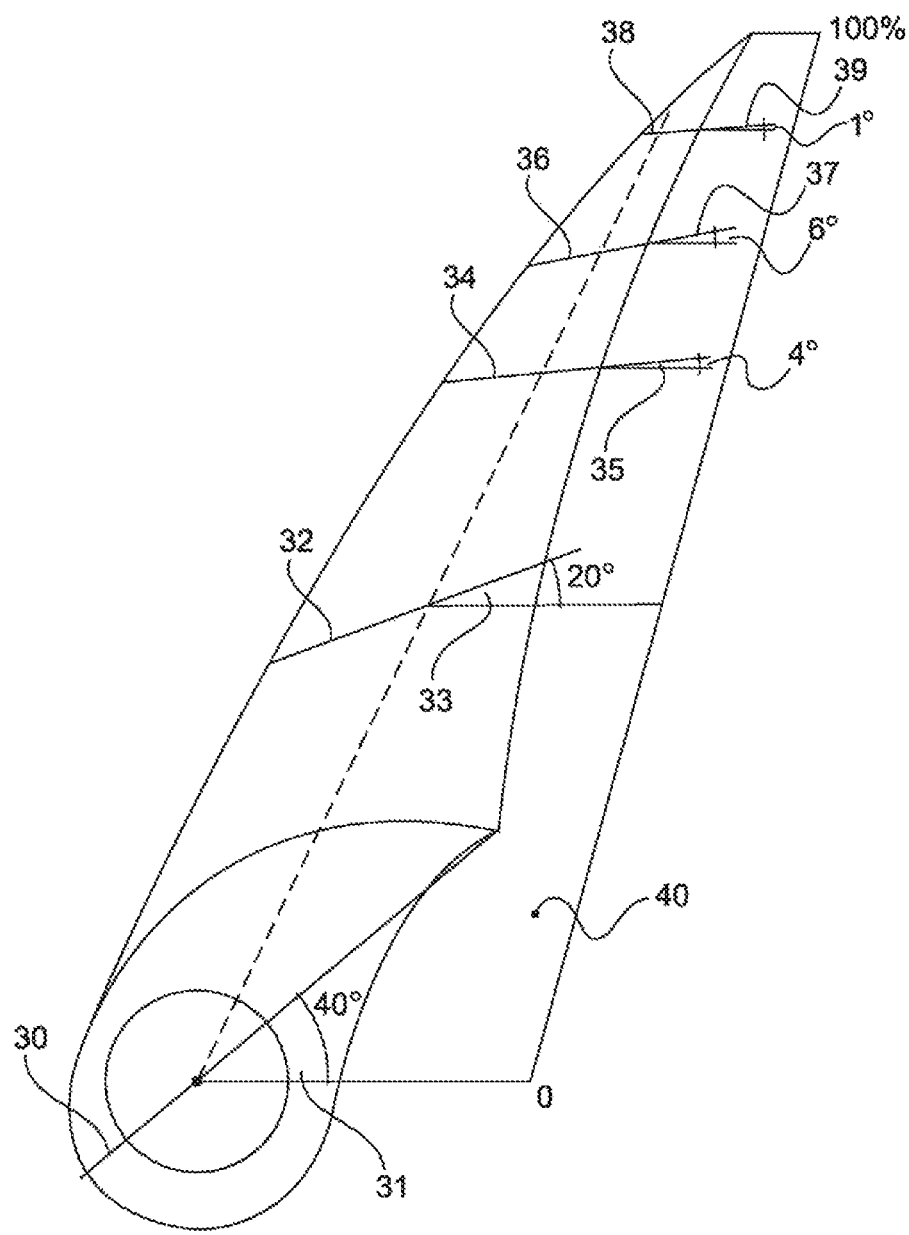
FIG. 4 schematically shows a perspective view of an embodiment of a rotor blade.

FIG. 4 shows purely schematically in a perspective view one embodiment of a rotor blade. Various profile chords along the rotor radius from the individual regions of the rotor blade are shown. There are illustrated five profile chords 30, 32, 34, 36, 38 which have an angle with respect to a reference plane 40 which constitutes the rotor plane of the rotor of the wind turbine. The profile chord 30 has a large installation angle 31 with respect to the rotor plane 40 and constitutes a profile chord in the vicinity of the blade root of the rotor blade at a radius position r/R of approximately 0.05. The installation angle 31 is 40° at this radius position.

The profile chord 32 is also shown. The angle 33 indicates the installation angle 33 of the profile chord 32 with respect to the rotor plane 40. The installation angle 33 is approximately 20° at approximately a rotor radius r/R of 0.25.

The profile chord 34 also indicates a profile chord in the blade inner region. However, the installation angle 35 of the profile chord 34 is considerably smaller than the installation angle 33 of the profile chord 32. The installation angle 35 is 4° at a rotor radius of approximately 0.35.

The profile chord 36 indicates a profile chord in the blade central region and has a larger installation angle 37 than the installation angle 35 of the profile chord 34. However, the installation angle 37 is smaller than the installation angle 33 of the profile chord 32. The installation angle 37 is 6° at a rotor radius of approximately 0.55.

The profile chord 38 indicates a profile chord in the blade tip region in the vicinity of the blade tip. The installation angle 39 is smaller than the installation angle 37 of the profile chord 36 and also smaller than the installation angle 35 of the profile chord 34. The installation angle 39 of the profile chord 38 is 1° at a rotor radius of 0.9.

The installation angles 31, 33, 35, 37 and 39 reflect the progression 28 from FIG. 3; however, they are not true to scale but illustrated purely schematically. The stated degree values and rotor blade radii are also purely exemplary and are not intended to be limiting.

Figure 5:
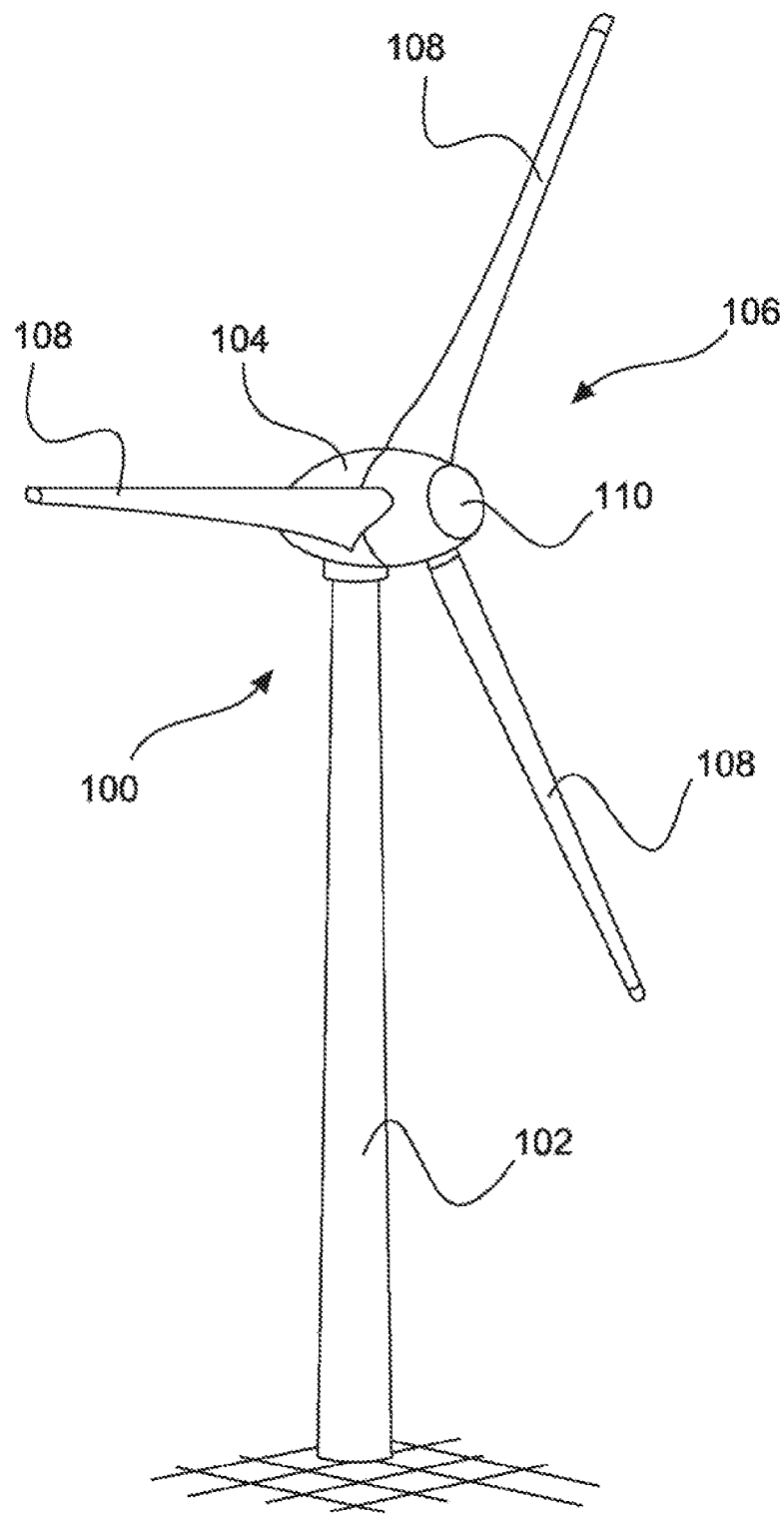
FIG. 5 shows a wind turbine in perspective in a schematic illustration.

FIG. 5 shows a wind turbine 100 according to the invention having a tower 102 and a nacelle 104. On the nacelle 104 there is arranged a rotor 106 having three rotor blades 108 according to the invention and a spinner 110. During operation, the rotor 106 is set in a rotational movement by the wind and thus drives a generator in the nacelle 104.

The schematically illustrated rotor blades 108 can be fastened, for example, by means of a blade connection or blade adapter to a rotor hub of the wind turbine that is arranged within the spinner 110. For this reason, the progressions of the respective variables of the rotor blade have a free region on the left-hand side in FIGS. 1a to 1c, 2 and 3, this region substantially reflecting the region of the rotor hub. The rotor blades can be rotated about their longitudinal axis via pitch devices arranged on the rotor blades 108 of the wind turbine 100, with the result that the installation angle of the rotor blades can be changed during the operation.

The invention claimed is:

1. A rotor blade of an aerodynamic rotor of a wind turbine, the aerodynamic rotor having a rotor axis of rotation and an outer radius, the rotor blade comprising:
   a blade root for fastening to a rotor hub;
   a blade tip facing away from the blade root;
   a blade longitudinal axis extending from the blade root to the blade tip;
   a blade front edge facing toward a front in a direction of movement of the rotor blade;
   a blade rear edge facing toward a rear in the direction of movement of the rotor blade; and
   a plurality of profile sections along the blade longitudinal axis,
   wherein each profile section has a profile chord extending from the blade front edge to the blade rear edge, wherein each profile chord has an installation angle as an angle in relation to a rotor plane, and wherein the installation angle from the blade root to the blade tip:
first decreases in a blade inner region oriented toward the blade root,
increases again in a blade central region from 35% to 60% with respect to the outer radius, wherein the outer radius is 100%, and
decreases again in a blade tip region oriented toward the blade tip.

2. The rotor blade as claimed in claim 1, wherein the plurality of profile sections have a relative profile thickness with a value of greater than 0.25 at least in certain portions in a region of greater than 60% with respect to the outer radius.

3. The rotor blade as claimed in claim 1, wherein the installation angle has a local minimum in a region of between 80% and 100% with respect to the outer radius.

4. The rotor blade as claimed in claim 1, wherein the installation angles of the profile chords are positive over an entire length of the rotor blade.

5. The rotor blade as claimed in claim 1, wherein the installation angle is 4° in a region of between 30% and 40% with respect to the outer radius, is 5° in a region of between 45% and 60% with respect to the outer radius, and is 1° in a region of between 85% and 95% with respect to the outer radius.

6. The rotor blade as claimed in claim 1, wherein the blade inner region extends to a radius of 35% with respect to the outer radius.

7. The rotor blade as claimed in claim 1, wherein a ratio of the installation angle at a radius position of 60% to the installation angle at a radius position of 40% is greater than 1.2.

8. The rotor blade as claimed in claim 7, wherein the ratio is greater than 2.

9. The rotor blade as claimed in claim 1, wherein the blade tip region extends in a radius of greater than 60% with respect to the outer radius.

10. A rotor of a wind turbine having a rotor axis of rotation and an outer radius, wherein at least one rotor blade as claimed in claim 1 is attached to the rotor.

11. A rotor blade of an aerodynamic rotor of a wind turbine, the aerodynamic rotor having a rotor axis of rotation and an outer radius, the rotor blade comprising:
a blade root for fastening to a rotor hub;
a blade tip facing away from the blade root;
a blade longitudinal axis extending from the blade root to the blade tip;
a blade front edge facing toward a front in a direction of movement of the rotor blade;
a blade rear edge facing toward a rear in the direction of movement of the rotor blade; and
a plurality of profile sections along the blade longitudinal axis,
wherein each profile section has a profile chord extending from the blade front edge to the blade rear edge, wherein each profile chord has an installation angle as an angle in relation to a rotor plane, and wherein the installation angle from the blade root to the blade tip:
first decreases in a blade inner region oriented toward the blade root,
increases again in a blade central region, and
decreases again in a blade tip region oriented toward the blade tip,
wherein the installation angle has a local maximum in a region of between 35% and 80% with respect to the outer radius, wherein the outer radius is 100%.

12. A wind turbine for generating electrical energy, the wind turbine comprising:
an aerodynamic rotor; and
at least one rotor blade attached to the aerodynamic rotor, wherein the at least one rotor blade includes:
a blade root for fastening to a rotor hub;
a blade tip facing away from the blade root;
a blade longitudinal axis which extends from the blade root to the blade tip;
a blade front edge facing toward a front in a direction of movement of the rotor blade;
a blade rear edge facing toward a rear in the direction of movement of the rotor blade; and
a plurality of profile sections along the blade longitudinal axis,
wherein each profile section has a profile chord extending from the blade front edge to the blade rear edge, wherein each profile chord has an installation angle as an angle in relation to a rotor plane, and wherein the installation angle from the blade root to the blade tip:
first decreases in a blade inner region oriented toward the blade root,
increases again in a blade central region from 35% to 60% with respect to an outer radius, wherein the outer radius is 100%, and
decreases again in a blade tip region oriented toward the blade tip.

13. The wind turbine as claimed in claim 12 wherein the blade tip region extends in a radius of greater than 60% with respect to the outer radius.

* * * * *